(12) United States Patent
Ochi et al.

(10) Patent No.: US 11,267,232 B2
(45) Date of Patent: Mar. 8, 2022

(54) DECORATIVE FILM, METHOD FOR PRODUCING DECORATIVE FILM, AND METHOD FOR PRODUCING THREE-DIMENSIONAL MOLDED PRODUCT PROVIDED WITH DECORATIVE FILM

(71) Applicant: AGC Inc., Tokyo (JP)

(72) Inventors: Shuhei Ochi, Tokyo (JP); Shiori Yoshigami, Tokyo (JP); Shun Saito, Tokyo (JP); Takashi Yoshida, Tokyo (JP); Yoshiya Matsuda, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/117,567

(22) Filed: Dec. 10, 2020

(65) Prior Publication Data

US 2021/0101376 A1 Apr. 8, 2021

Related U.S. Application Data

(63) Continuation of application No. PCT/JP2019/023339, filed on Jun. 12, 2019.

(30) Foreign Application Priority Data

Jun. 13, 2018 (JP) .............................. JP2018-113189

(51) Int. Cl.
*B32B 27/08* (2006.01)
*B29C 51/12* (2006.01)
(Continued)

(52) U.S. Cl.
CPC .............. *B32B 27/08* (2013.01); *B29C 51/12* (2013.01); *B32B 27/22* (2013.01); *B32B 27/304* (2013.01);
(Continued)

(58) Field of Classification Search
None
See application file for complete search history.

(56) References Cited

U.S. PATENT DOCUMENTS

2003/0165668 A1* 9/2003 Yukawa .................. B41M 5/40
428/195.1

FOREIGN PATENT DOCUMENTS

JP 08-118553 A 5/1996

OTHER PUBLICATIONS

International Search Report dated Jul. 30, 2019 in PCT/JP2019/023339 filed on Jun. 12, 2019, 1 page.

* cited by examiner

*Primary Examiner* — Ramsey Zacharia
(74) *Attorney, Agent, or Firm* — Oblon, McClelland, Maier & Neustadt, L.L.P.

(57) ABSTRACT

To provide a decorative film in which swelling of a layer containing a fluorinated polymer is suppressed and adhesion of the layer containing the fluorinated polymer is excellent; and a method for producing a three-dimensional molded product provided with a decorative film. The decorative film is characterized by comprising a base film containing a plasticizer; a first layer containing at least one member selected from the group consisting of a polyvinylidene fluoride, a polymethyl methacrylate and a polyurethane; and a second layer containing a fluorinated polymer comprising units based on a fluoroolefin and units based on at least one type of non-fluorinated monomer selected from the group consisting of a vinyl ether, a vinyl ester, an allyl ether and an allyl ester, in this order; wherein the water contact angle of the surface on the first layer side of the second layer is larger than the water contact angle on the second layer side of the first layer, and the difference between the water contact angle of the surface on the first layer side of the (Continued)

second layer and the water contact angle of the surface on the second layer side of the first layer is more than 0° and at most 50°.

13 Claims, 1 Drawing Sheet

(51) Int. Cl.
    *B32B 27/22*     (2006.01)
    *B32B 27/30*     (2006.01)
    *B29C 51/10*     (2006.01)
(52) U.S. Cl.
    CPC ........... *B29C 51/10* (2013.01); *B32B 2255/10* (2013.01); *B32B 2255/26* (2013.01); *B32B 2307/584* (2013.01); *B32B 2605/003* (2013.01)

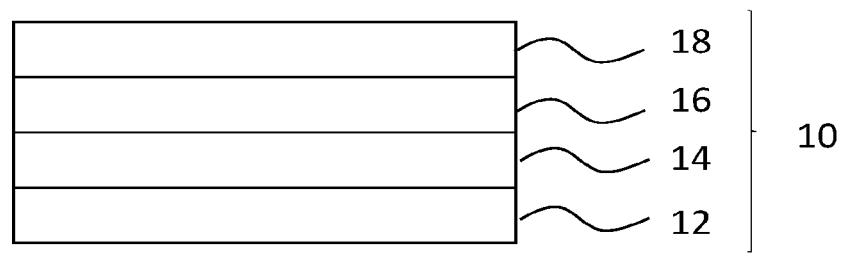

DECORATIVE FILM, METHOD FOR PRODUCING DECORATIVE FILM, AND METHOD FOR PRODUCING THREE-DIMENSIONAL MOLDED PRODUCT PROVIDED WITH DECORATIVE FILM

TECHNICAL FIELD

The present invention relates to a decorative film, a method for producing a decorative film, and a method for producing a three-dimensional molded product provided with a decorative film.

BACKGROUND ART

The surface of a three-dimensional molded product to be used in the field of interior/exterior products for automobiles may sometimes be decorated by a decorative film for the purpose of imparting a design property or protecting the surface. Patent Document 1 discloses a decorative film in which a fluororesin layer is disposed on a layer containing a polyvinyl chloride.

PRIOR ART DOCUMENT

Patent Document

Patent Document 1: JP-A-H8-118553

DISCLOSURE OF INVENTION

Technical Problem

As a material to constitute the fluororesin layer, various fluorinated polymers containing units based on a fluoroolefin are known.

With reference to Patent Document 1, the present inventors have disposed a layer containing a predetermined fluorinated polymer on a base film containing a plasticizer, and thereby have found that there is a case where the plasticizer migrates to a layer containing the fluorinated polymer, whereby the layer containing the fluorinated polymer undergoes swelling.

Therefore, it has been attempted to prevent the migration of the plasticizer by interposing another layer between the base film and the layer containing the fluorinated polymer, whereby there has been a case where the adhesion of the layer containing the fluorinated polymer is inferior.

An object of the present invention is to provide a decorative film in which swelling of a layer containing a fluorinated polymer is suppressed, and the layer containing a fluorinated polymer is excellent in adhesion.

Another object of the present invention is to provide a method for producing a three-dimensional molded product provided with a decorative film.

Solution to Problem

As a result of diligent studies, the present inventors have found that the problem can be solved by the following constructions.

(1) A decorative film characterized by comprising
a base film containing a plasticizer,
a first layer containing at least one member selected from the group consisting of a polyvinylidene fluoride, a polymethylmethacrylate, a polyurethane and a polyester, and
a second layer containing a fluorinated polymer containing units based on a fluoroolefin, and units based on at least one non-fluorinated monomer selected from the group consisting of a vinyl ether, a vinyl ester, an allyl ether and an allyl ester,
in this order, wherein
the water contact angle of the surface on the first layer side of the second layer is larger than the water contact angle of the surface on the second layer side of the first layer, and the difference between the water contact angle of the surface on the first layer side of the second layer and the water contact angle of the surface on the second layer side of the first layer is more than 0 degree and at most 50 degrees.

(2) The decorative film according to (1), wherein the second layer contains a silicone-type surface conditioner or a fluorinated surface conditioner.

(3) The decorative film according to (1) or (2), wherein the difference between the water contact angle of the surface on the first layer side of the second layer and the water contact angle of the surface on the second layer side of the first layer is at least 10 degrees.

(4) The decorative film according to any one of (1) to (3), wherein the difference between the water contact angle of the surface on the first layer side of the second layer and the water contact angle of the surface on the second layer side of the first layer is at most 30 degrees.

(5) The decorative film according to any one of (1) to (4), wherein the fluorinated polymer has a crosslinked structure.

(6) The decorative film according to any one of (1) to (5), wherein the base film contains at least one member selected from the group consisting of a vinyl chloride resin, a polyester resin, an ABS resin and a (meth)acrylic resin.

(7) The decorative film according to any one of (1) to (6), wherein the content of the plasticizer is from 0.5 to 30 mass % to the total mass of the base film.

(8) The decorative film according to any one of (1) to (7), wherein the plasticizer is a plasticizer containing at least one member selected from the group consisting of a phthalic acid ester, an adipic acid ester, a phosphoric acid ester and a trimellitic acid ester.

(9) The decorative film according to any one of (1) to (8), which is used for decorating a three-dimensional molded product used for an automobile exterior part or an automobile interior part.

(10) A method for producing a decorative film, which comprises applying a composition having a surface tension of from 10 to 40 mN/m onto the surface of a first layer laminated on a base film and having a water contact angle of from 60 to 100 degrees, to form a second layer, thereby to obtain the decorative film as defined in any one of (1) to (9).

(11) The method for producing a decorative film according to (10), wherein the composition comprises a fluorinated polymer having a crosslinkable group and a curing agent, and
the ratio of the number of moles of the crosslinkable group which the curing agent has to the number of moles of the crosslinkable group which the fluorinated polymer has, is from 0.05 to 2.0.

(12) The method for producing a decorative film according to (11), wherein the number average molecular weight of the fluorinated polymer is from 2,000 to 50,000.

(13) A method for producing a three-dimensional molded product provided with a decorative film, which comprises press-bonding the decorative film as defined in any one of (1) to (9) and the surface to be decorated of a three-dimensional molded product, under reduced pressure, to obtain the three-dimensional molded product provided with the decorative film, having the second layer at the outermost surface.

Advantageous Effects of Invention

According to the present invention, it is possible to provide a decorative film in which swelling of the layer containing a fluorinated polymer is suppressed and the layer containing a fluorinated polymer is excellent in adhesion.

Further, according to the present invention, it is possible to provide a method for producing a three-dimensional molded product provided with a decorative film.

BRIEF DESCRIPTION OF DRAWING

FIG. 1 is a schematic side view showing an example of the layered structure of the decorative film of the present invention.

DESCRIPTION OF EMBODIMENTS

The meanings of terms in the present invention are as follows.

A (meth)acrylate is a general term for an acrylate and a methacrylate. Similarly, (meth)acrylic acid is a general term for acrylic acid and methacrylic acid, and (meth)acrylamide is a general term for acrylamide and methacrylamide. Further, a (meth)acrylic resin means a resin composed of a polymer composed mainly of units based on a (meth)acrylate.

A unit is a general term for an atomic group based on one molecule of a monomer, which is directly formed by polymerization of the monomer, and an atomic group obtained by chemically converting a part of the atomic group. The content (mol %) of each unit to all units contained in the polymer is obtainable by analyzing the polymer by a nuclear magnetic resonance spectrum (NMR) method.

An acid value and a hydroxy value are, respectively, values measured according to the method of JIS K 0070-3 (1992).

A glass transition temperature is the midpoint glass transition temperature of a polymer as measured by the differential scanning calorimetry (DSC) method. The glass transition temperature is referred to also as Tg.

A softening temperature is a value measured in accordance with the method of JIS K 7196 (1991).

A number average molecular weight and a weight average molecular weight are values measured by gel permeation chromatography using polystyrene as a standard substance. The number average molecular weight is referred to also as Mn, and the weight average molecular weight is referred to also as Mw.

The thickness of the decorative film is a value measured by using an eddy current type film thickness meter. As the eddy current type film thickness meter, for example, EDY-5000 manufactured by SANKO ELECTRONIC LABORATORY CO., LTD. may be used. The thickness of each layer in the decorative film can be calculated from the ratio of the thickness of each layer obtained by observing the cross section of the decorative film with a scanning electron microscope equipped with an energy dispersive X-ray analyzer, and the thickness of the decorative film.

The total light transmittance is a value measured with a D light source in accordance with JIS K 7361-1: 1997.

The surface tension of the composition is a value obtainable by the du Nouy method (ring method).

The mass of the solid content of the composition is, when the composition contains a solvent, the mass obtained by removing the solvent from the composition. Here, the components constituting the solid content of the composition other than the solvent are regarded as the solid content even if their properties are liquid. The mass of the solid content of the composition is obtained as the mass remaining after heating 1 g of the composition at 130° C. for 20 minutes.

The decorative film of the present invention (hereinafter referred to also as the present decorative film) has a base film containing a plasticizer, a first layer containing at least one member (hereinafter referred to also as a specific polymer) selected from the group consisting of a polyvinylidene fluoride, a polymethylmethacrylate, a polyurethane and a polyester, and a second layer containing a fluorinated polymer (hereinafter referred to also as a fluorinated polymer F) containing units (hereinafter referred to also as units F) based on a fluoroolefin and units (hereinafter referred to also as units D) based on at least one type of monomer (hereinafter referred to also as a monomer D) selected from the group consisting of a vinyl ether, a vinyl ester, an allyl ether and an allyl ester, in this order.

Further, the water contact angle of the surface on the first layer side of the second layer is larger than the water contact angle of the surface on the second layer side of the first layer, and the difference of the water contact angle of the surface on the first layer side of the second layer and the water contact angle of the surface on the second layer side of the first layer is more than 0 degree and at most 50 degrees.

In a case where the second layer is disposed so as to be in contact with the base film, the plasticizer contained in the base film may sometimes move to the second layer, whereby the second layer may swell. Whereas, the present inventors have found that when the first layer containing a predetermined component is disposed between the base film and the second layer, the migration of the plasticizer to the second layer is suppressed.

However, depending on the properties of the layer disposed between the base film and the second layer, there may be a case where the adhesion between the first layer and the second layer becomes inferior. Therefore, the present inventors have adjusted the water contact angle of the surface on the first layer side of the second layer and the water contact angle of the surface on the second layer side of the first layer to a predetermined relationship, whereby it has been found that the adhesion between the first layer and the second layer has been improved. The reason for this is not necessarily clear, but it is considered that the affinity of the first layer and the second layer at the interface is improved when the hydrophobicity of the second layer to the first layer is in a specific state. Further, it is conceivable that due to the effect of suppressing the migration of the plasticizer by the first layer, the plasticizer does not exist at the interface between the first layer and the second layer, so that the adhesion between the first layer and the second layer is maintained at a high level.

First, the construction of the present decorative film will be described with reference to the drawing.

FIG. 1 is a schematic side view showing the layered structure of the decorative film 10 according to one embodiment of the present invention. The decorative film 10 has a bonding layer 12, a base film 14, a first layer 16 and a second layer 18, and the respective layers are disposed in this order.

When the bonding layer 12 of the decorative film 10 and the surface to be decorated of a three-dimensional molded product (as described later) are bonded, it is possible to obtain the three-dimensional molded product provided with the decorative film, in which the second layer 18, the first layer 16, the base film 14, the bonding layer 12 and the three-dimensional molded product are disposed in this order. Thus, the second layer 18 is located at the outermost surface of the three-dimensional molded product provided with the decorative film.

In the following, the respective members constituting the decorative film will be described in detail.

The base film functions as a support film to support the respective layers at the time of producing the present decorative film.

Specific examples of the material to constitute the base film may be a vinyl chloride resin, a polyester resin, an ABS resin (an acrylonitrile-butadiene-styrene copolymer), an AAS resin (an acrylonitrile/acrylic acid ester/styrene copolymer) and an AES resin (an acrylonitrile/ethylene-propylene-diene/styrene copolymer), a (meth)acrylic resin and an olefin resin.

Among them, as the material to constitute the base film, at least one member selected from the group consisting of a vinyl chloride resin, a polyester resin, an ABS resin and a (meth)acrylic resin, is preferred. Particularly when the material to constitute the base film is a vinyl chloride resin, the effect of the present invention will be most exhibited.

The base film contains a plasticizer. Specific examples of the plasticizer may be a phthalic acid ester, an adipic acid ester, a phosphoric acid ester, a trimellitic acid ester, a fatty acid ester and an epoxy compound, and a phthalic acid ester, an adipic acid ester, a phosphoric acid ester and a trimellitic acid ester are preferred, and a phthalic acid ester and an adipic acid ester are particularly preferred.

The base film may contain two or more plasticizers.

Specific examples of the phthalic acid ester may be dimethyl phthalate, diethyl phthalate, dibutyl phthalate, dihexyl phthalate, dioctyl phthalate, di-2-ethylhexyl phthalate, butylbenzyl phthalate and diisononyl phthalate. Di-2-ethylhexyl phthalate and diisononyl phthalate are preferred.

Specific examples of the adipic acid ester may be dibutyl adipate, dioctyl adipate, butoxyethoxyethyl benzyl adipate, dibutoxyethoxyethyl adipate and diisodecyl adipate.

Specific examples of the phosphoric acid ester may be tributyl phosphate, tri-2-ethylhexyl phosphate, trioctyl phosphate, triphenyl phosphate, diphenyl-2-ethylhexyl phosphate, tricresyl phosphate and tris(ethoxyethoxyethyl) phosphate.

Specific examples of the trimellitic acid ester may be trimethyl trimellitate, triethyl trimellitate, trioctyl trimellitate, tri-2-ethylhexyl trimellitate, triisononyl trimellitate and triisodecyl trimellitate.

A specific example of the fatty acid ester may be isobutyl oleate.

Specific examples of the epoxy compound may be epoxidized soybean oil, epoxidized linseed oil and an epoxidized fatty acid alkyl ester (an epoxidized fatty acid octyl ester, etc.).

The content of the plasticizer is preferably from 0.5 to 30 mass %, more preferably from 1.0 to 20 mass %, particularly preferably from 2.0 to 10 mass %, to the total mass of the base film.

In the present decorative film, in a case where the material to constitute the base film is a vinyl chloride resin, and the plasticizer contained in the base film is a phthalic acid ester, an adipic acid ester, a phosphoric acid ester or a trim ellitic acid ester, its effects will be remarkably exhibited.

The thickness of the base film is preferably from 10 to 500 µm, particularly preferably from 20 to 100 µm.

The base film may have a concavo-convex pattern on at least one side. The concavo-convex pattern may be formed by a processing method such as embossing, hairline processing or chemical etching processing.

The first layer is a layer disposed on the base film, and is a layer to suppress migration of the plasticizer contained in the base film to the second layer. Here, the first layer may be disposed so as to be in contact with the base film, or may be disposed via another layer.

The first layer contains at least one member selected from the group consisting of a polyvinylidene fluoride, a polymethylmethacrylate, a polyurethane and a polyester, and does not contain the fluorinated polymer F to be contained in the second layer. A polyvinylidene fluoride is preferred from such a viewpoint that it suppresses the migration of the plasticizer to the second layer, has excellent weather resistance and protects the base film. A polyester is preferred from such a viewpoint that adhesion to the base film will be excellent.

The first layer may have its surface on the base film side or its surface on the second layer side, metal-deposited. In such a case, since a metallic luster will be imparted to the appearance of the first layer, it is particularly suitable for applying the decorative film of the present invention to an automobile interior or automobile exterior part. The metal to be used for metal vapor deposition may be aluminum, tin, silver, indium, etc., and, from the viewpoint of excellent radio wave transmission, indium is preferred.

The polyvinylidene fluoride is a polymer obtainable by polymerizing vinylidene fluoride.

The polyvinylidene fluoride may be a homopolymer of vinylidene fluoride, or may be a copolymer of vinylidene fluoride and another monomer so long as the characteristics of the polyvinylidene fluoride are not impaired. Specific examples of another monomer may be a hydrocarbon-type vinyl monomer such as ethylene, propylene, isobutene, butadiene, etc., a (meth)acrylate monomer such as methyl (meth)acrylate, ethyl (meth)acrylate, etc., a fluorinated vinyl monomer such as tetrafluoroethylene, trifluoroethylene, chlorotrifluoroethylene, hexafluoropropylene, etc., and an unsaturated carboxylic acid such as perfluorobutenoic acid, maleic acid, etc.

Here, the range in which the characteristics of the polyvinylidene fluoride are not impaired, means that the content of units based on said another monomer is at most 70 mol %, to all units which the polyvinylidene fluoride contains, and, from the viewpoint of excellent resistance to the plasticizer, less than 50 mol % is more preferred, less than 5 mol % is further preferred, and less than 3 mol % is particularly preferred.

Mw of the polyvinylidene fluoride is preferably from 50,000 to 5,000,000, particularly preferably from 70,000 to 500,000.

The polymethylmethacrylate is a polymer obtainable by polymerizing methylmethacrylate. The polymethylmethacrylate is preferred from such a viewpoint that it has excellent flexibility and excellent followability to the base film.

The polymethylmethacrylate may be a homopolymer of methyl methacrylate, or may be a copolymer of methyl methacrylate and another monomer so long as the characteristics of the polymethylmethacrylate are not impaired. Specific examples of another monomer may be a (meth) acrylate other than methyl methacrylate (such as ethyl (meth)acrylate, butyl (meth)acrylate, propyl (meth)acrylate, 2-ethylhexyl (meth)acrylate, and a (meth)acrylate which may have a hydroxy group or an epoxy group), an unsaturated carboxylic acid ((meth)acrylic acid, maleic acid, itaconic acid, etc.), an unsaturated carboxylic acid anhydride (maleic anhydride, itaconic anhydride, etc.), a (meth)acrylamide, acrylonitrile and styrene.

Here, the range in which the characteristics of the polymethylmethacrylate are not impaired means that the content of units based on another monomer is at most 50 mol % to all units which the polymethylmethacrylate contains, and, from the viewpoint of excellent resistance to the plasticizer, it is preferably less than 20 mol %.

Mw of the polymethylmethacrylate is preferably from 30,000 to 200,000, particularly preferably from 40,000 to 150,000.

The polyurethane is a polymer having a plurality of urethane bonds. Generally, a polyurethane is obtainable by a polyaddition reaction of a polyisocyanate and a polyol. The polyurethane is preferred from such a viewpoint that it has excellent chemical resistance and suppresses migration of the plasticizer to the second layer.

Specific examples of the polyisocyanate may be xylylene diisocyanate, tetramethyl-m-xylylene diisocyanate, hexamethylene diisocyanate, isophorone diisocyanate, hydrogenated xylylene diisocyanate, and dicyclohexylmethane diisocyanate.

Specific examples of the polyol may be high molecular weight polyols (for example, polyether-type polyols, polyester-type polyols, polycarbonate-type polyols, polyolefin-type polyols).

Mw of the polyurethane is preferably from 50,000 to 300,000, particularly preferably from 70,000 to 150,000.

The polyester is a polymer obtainable by dehydration condensation of a polyvalent carboxylic acid and a polyhydric alcohol, or transesterification reaction of a polyvalent carboxylic acid and a polyvalent carboxylic acid ester.

The polyvalent carboxylic acid may be phthalic acid, isophthalic acid, terephthalic acid, naphthalenedicarboxylic acid, trimellitic acid, pyromellitic acid, phthalic acid anhydride, etc. As the polyvalent carboxylic acid, from the viewpoint of excellent adhesion to the base film, isophthalic acid or terephthalic acid is preferred, and terephthalic acid is particularly preferred.

The polyhydric alcohol may be ethylene glycol, diethylene glycol, triethylene glycol, 1,2-propanediol, 1,3-propanediol, 1,3-butanediol, 1,4-butanediol, 1,5-pentanediol, neopentyl glycol, spiroglycol, 1,10-decanediol, 1,4-cyclohexanedimethanol, trimethylolethane, glycerin, pentaerythritol, etc. As the polyhydric alcohol, from the viewpoint of excellent adhesion to the base film, ethylene glycol is preferred.

The polyvalent carboxylic acid ester may be dimethyl terephthalate, dimethyl naphthalenedicarboxylate, etc., and dimethyl terephthalate is preferred.

As the polyester, from the viewpoint of excellent adhesion to the base film, polyethylene terephthalate is particularly preferred.

Mw of the polyester is preferably from 5,000 to 100,000, particularly preferably from 10,000 to 50,000.

The content of the specific polymer in the first layer is preferably at least 90 mass %, more preferably at least 95 mass %, to the total mass of the first layer, from the viewpoint of suppressing migration of the plasticizer to the second layer. The upper limit is usually 100 mass %.

As the specific polymer, two or more types may be used in combination.

From the viewpoint of excellent compatibility, it is preferred to use a polyvinylidene fluoride and a polymethylmethacrylate in combination as the specific polymer. Due to the mixing ratio of the polyvinylidene fluoride and the polymethylmethacrylate, the weather resistance and flexibility of the first layer will be both superior. In a case where the polyvinylidene fluoride and the polymethylmethacrylate are used in combination, the mass ratio of the polymethylmethacrylate to the polyvinylidene fluoride is preferably from 0.1 to 9.5, particularly preferably from 0.9 to 9.0.

The present decorative film may have two or more first layers. For example, in a case where a first layer containing a polyester as a main component and a first layer containing a polyurethane as a main component are laminated, the adhesion between the base film or the second layer and the first layer will be more excellent.

The first layer may contain components other than the specific polymer. Specific examples of the components other than the specific polymer may be a filler (an inorganic filler such as silica, an organic filler such as resin beads), a colorant (a dye, an organic pigment, an inorganic pigment, a bright pigment using metal, mica, etc.), an ultraviolet absorber, a light stabilizer, a matting agent and a degassing agent. Particularly in a case where the first layer contains a colorant, the decorative film of the present invention will be excellent in the design property.

Further, the first layer preferably contains substantially no plasticizer. Here, "contains substantially no plasticizer" means that the content of the plasticizer is at most 5 mass % to the total mass of the first layer. The content of the plasticizer in the first layer is preferably at most 1 mass % from the viewpoint of suppressing its migration to the second layer. The lower limit is usually 0 mass %.

The thickness of the first layer is preferably from 2 to 200 μm, more preferably from 5 to 100 μm, from the viewpoint of stretchability of the decorative film.

The water contact angle of the surface on the second layer side of the first layer is preferably from 60 to 100 degrees, more preferably from 70 to 90 degrees, from the viewpoint of adhesion between the first layer and the second layer.

The above water contact angle is a static contact angle of pure water, and can be measured by the θ/2 method in accordance with JIS R3257: 1999. Specifically, a droplet having a diameter of from 1 to 2 mm is dropped on the surface of a sample, and 30 seconds after the droplet is deposited, the angle θ1 of the straight line connecting the left and right end points and the apex of the water droplet, to the sample surface, is obtained, and this is doubled to obtain the water contact angle θ2 (θ2=2θ1). The average value obtainable by measuring 5 times by this measuring method is the target water contact angle.

Here, by taking a photograph of the state of the droplet on the surface of the sample, and enlarging the photograph, the water contact angle θ2 can be calculated by direct reading or by analyzing the image. As the measuring device, an automatic contact angle meter (DM-501, manufactured by Kyowa Interface Science Co., Ltd., etc.) may be used.

Further, in a decorative film having a laminated structure as shown in FIG. 1, in order to measure the water contact angle of the surface on the second layer side of the first layer, at the interface L between the first layer and the second layer, the first layer and the second layer may be peeled to expose the surface of the first layer, and the water contact angle on the obtained surface of the first layer may be measured. In the case of exposing the surface of the first layer, first, the cross section is observed by a scanning electron microscope equipped with an energy dispersive X-ray analyzer, and the depth of each layer is estimated, whereupon the second layer is removed by using a peel strength tester (for example, SAICAS EN.NN manufactured by DAIPLA WINTES CO., LTD.), etc., to obtain a uniform surface of the first layer. In such a case, any surface within 2 μm to the first layer side from the interface L may be regarded as the surface on the second layer side of the first layer.

However, in a case where the first layer is a uniform layer, the value obtained by cutting the first layer by an arbitrary surface parallel to the interface L and measuring the water contact angle on the obtained cut surface, may be regarded as the water contact angle of the surface on the second layer side of the first layer. Here, "the first layer is a uniform layer" means that the difference between the water contact angle of the surface on the second layer side of the first layer and the water contact angle of the surface on the base film side of the first layer is at most 5 degrees (preferably at most 3 degrees).

A specific example of the method for forming the first layer may be a method of laminating a film or the like containing the specific polymer on a base film. Further, as another method, a method of applying a solution containing the specific polymer on a base film and performing a drying treatment or a heat treatment as the case requires, may be mentioned.

The second layer is a layer disposed on the first layer, and is usually located at the outermost layer of the present decorative film. By disposing the second layer at the outermost layer, the scratch resistance of the present decorative film will be improved.

The second layer contains the fluorinated polymer F.

The fluorinated polymer F may have a crosslinked structure. The crosslinked structure of the fluorinated polymer F may be a structure formed by cross-linking a fluorinated polymer F having no crosslinked structure by electron beam crosslinking or the like, or may be a structure formed by cross-linking a fluorinated polymer F having a crosslinkable group and no crosslinked structure (hereinafter referred to also as a fluorinated polymer $F^0$) with a curing agent or the like. The fluorinated polymer F contained in the second layer may be a fluorinated polymer F having a partially crosslinked structure, or may be a fluorinated polymer F having a completely crosslinked structure.

In a case where the fluorinated polymer F has a crosslinked structure, such a fluorinated polymer F is preferably a crosslinked product of the fluorinated polymer $F^0$.

Further, the fluorinated polymer F contained in the second layer is usually a non-block copolymer.

A fluoroolefin is an olefin in which at least one hydrogen atom is substituted by a fluorine atom. In the fluoroolefin, at least one hydrogen atom which is not substituted by a fluorine atom may be substituted by a chlorine atom. The number of carbon atoms in the fluoroolefin is preferably from 2 to 8, particularly preferably from 2 to 4.

Specific examples of the fluoroolefin may be $CF_2=CF_2$, $CF_2=CFCl$, $CF_2=CHF$, $CH_2=CF_2$, $CF_2=CFCF_3$, $CF_2=CHCF_3$, $CF_3CH=CHF$, $CF_3CF=CH_2$. As the fluoroolefin, from the viewpoint of copolymerizability, $CF_2=CF_2$, $CF_2=CFCl$, $CF_3CH=CHF$ and $CF_3CF=CH_2$ are preferred, $CF_2=CF_2$ and $CF_2=CFCl$ are more preferred, and $CF_2=CFCl$ is particularly preferred.

As the fluoroolefin, two or more types may be used in combination.

The content of units F is, from the viewpoint of weather resistance of the present decorative film, preferably from 20 to 70 mol %, more preferably from 40 to 60 mol %, particularly preferably from 45 to 55 mol %, to all units which the fluorinated polymer F contains.

Units D are considered to mainly contribute to the scratch resistance of the fluorinated polymer F. The monomer D is preferably a non-fluorinated monomer having no crosslinkable group and no fluorine atom.

As the monomer D, a monomer represented by the formula $X^1$—$Z^1$ is preferred.

$X^1$ is $CH_2=CHO-$, $CH_2=CHCH_2O-$, $CH_2=CHOC(O)-$ or $CH_2=CHCH_2OC(O)-$. As $X^1$, from the viewpoint of copolymerizability with the fluoroolefin and weather resistance of the present decorative film, $CH_2=CHO-$ and $CH_2=CHOC(O)-$ are preferred.

$Z^1$ is a $C_{1-24}$ hydrocarbon group. The monovalent hydrocarbon group may be linear or branched. Further, the monovalent hydrocarbon group may be made of a ring structure or may contain a ring structure. Further, the monovalent hydrocarbon group may be a monovalent saturated hydrocarbon group or a monovalent unsaturated hydrocarbon group.

As the monovalent hydrocarbon group, an alkyl group, a cycloalkyl group, an aryl group, an aralkyl group and a cycloalkylalkyl group are preferred, and a $C_{1-12}$ alkyl group, a $C_{6-10}$ cycloalkyl group, a $C_{6-10}$ aryl group, a $C_{7-12}$ aralkyl group and a $C_{6-10}$ cycloalkylalkyl group are particularly preferred.

As the monovalent hydrocarbon group, from the viewpoint of improving the flexibility of the decorative film, a $C_{1-12}$ alkyl group is preferred, and a $C_{1-4}$ alkyl group is particularly preferred.

Specific examples of the alkyl group may be a methyl group, an ethyl group, a tert-butyl group, a hexyl group, a nonyl group, a decyl group and a dodecyl group, and a methyl group is preferred.

A specific example of the cycloalkyl group may be a cyclohexyl group.

A specific example of the aralkyl group may be a benzyl group.

A specific example of the cycloalkylalkyl group may be a cyclohexylmethyl group.

Specific examples of the aryl group may be a phenyl group and a naphthyl group.

A hydrogen atom in the cycloalkyl group or the cycloalkyl moiety of the cycloalkylalkyl group, the aryl group or the aryl moiety of the aralkyl group, may be substituted by an alkyl group. In such a case, the number of carbon atoms of the alkyl group as the substituent is not included in the number of carbon atoms of the cycloalkyl group, the aryl group, or the aralkyl group.

Specific examples of the monomer D may be ethyl vinyl ether, tert-butyl vinyl ether, 2-ethylhexyl vinyl ether, cyclohexyl vinyl ether, vinyl acetate, vinyl pivalate, vinyl neononanoate ("Beova 9", trade name of HEXION), vinyl neodecanoate ("Beova 10", trade name of HEXION), vinyl benzoate, tert-butyl vinyl benzoate, tert-butyl (meth)acrylate, and benzyl (meth)acrylate.

As the monomer D, two or more types may be used in combination.

The content of units D is preferably from 1 to 60 mol %, particularly preferably from 25 to 40 mol %, to all units which the fluorinated polymer F contains.

The fluorinated polymer F preferably has a crosslinked structure from the viewpoint of hardness and scratch resistance of the present coating film and swelling resistance to a plasticizer. When the fluorinated polymer F has a crosslinked structure, even if a plasticizer is contained in a very small amount in the first layer, it is possible to further suppress its migration into the second layer.

As a method for producing a fluorinated polymer F having a crosslinked structure, a method of reacting a curing agent and a fluorinated polymer $F^0$ comprising units F, units D and units having a crosslinkable group (hereinafter referred to also as units C), may be mentioned.

Here, units F and units D which the fluorinated polymer $F^0$ contains, are as described above. Further, the preferred ranges of the contents of units F and units D in the fluorinated polymer $F^0$ are the same as the preferred ranges of the contents of the respective units in the fluorinated polymer F as described above.

Units C may be units based on a monomer having a crosslinkable group (hereinafter referred to also as a monomer C), or may be units obtainable by converting the crosslinkable group of the fluorinated polymer $F^0$ containing units C to a different crosslinkable group. Such units may be units obtainable by reacting a polycarboxylic acid or an acid anhydride thereof to a fluorinated polymer $F^0$ containing units having hydroxy groups to convert part or all of the hydroxy groups to carboxy groups. Units C preferably have no fluorine atom.

Specific examples of the crosslinkable group in units C may be a hydroxy group, a carboxy group, an amino group, an alkoxysilyl group, an epoxy group and an oxetanyl group, and, from the viewpoint of improving the strength of the present decorative film, a hydroxy group and a carboxy group are preferred.

As the monomer C in which the crosslinkable group is a hydroxy group, allyl alcohol, and a vinyl ether, vinyl ester, allyl ether, allyl ester and (meth)acrylate having a hydroxy group, may be mentioned, and allyl alcohol and a monomer represented by the formula $X^{21}$—$Z^{21}$ (hereinafter referred to also as a monomer C1) are preferred.

$X^{21}$ is $CH_2$=CHC(O)O—, $CH_2$=C($CH_3$)C(O)O—, $CH_2$=CHOC(O)—, $CH_2$=CHCH2OC(O)—, $CH_2$=CHO— or $CH_2$=CHCH$_2$O—, preferably $CH_2$=CHO— or $CH_2$=CHCH$_2$O—.

$Z^{21}$ is a $C_{2-42}$ monovalent organic group having a hydroxy group. The organic group may be linear or branched. Further, the organic group may be made of a ring structure or may contain a ring structure.

As the organic group, a $C_{2-6}$ alkyl group having a hydroxy group, an alkyl group containing a $C_{6-8}$ cycloalkylene group having a hydroxy group, and a polyoxyalkylene group having a hydroxy group are preferred.

Specific examples of the monomer C1 may be $CH_2$=CHO—$CH_2$-cyclo$C_6H_{10}$—$CH_2OH$, $CH_2$=CHCH$_2$O—$CH_2$-cyclo$C_6H_{10}$—$CH_2OH$, $CH_2$=CHOCH$_2$CH$_2$OH, $CH_2$=CHCH$_2$OCH$_2$CH$_2$OH, $CH_2$=CHOCH$_2$CH$_2$CH$_2$CH$_2$OH, $CH_2$=CHCH$_2$OCH$_2$CH$_2$CH$_2$CH$_2$OH, and $CH_2$=CHOCH$_2$-cyclo$C_6H_{10}$—$CH_2$O(CH$_2$CH$_2$O)$_{15}$H.

Here, "-cyclo$C_6H_{10}$—" represents a cyclohexylene group, and the binding site of (-cyclo$C_6H_{10}$—) is usually 1,4-.

As the monomer C1, two or more types may be used in combination.

As the monomer C in which the crosslinkable group is a carboxy group, an unsaturated carboxylic acid, (meth) acrylic acid, etc., may be mentioned, and a monomer represented by the formula $X^{22}$—$Z^{22}$ (hereinafter referred to also as a monomer C2) is preferred.

$X^{22}$ is $CH_2$=CH—, CH($CH_3$)=CH— or $CH_2$=C($CH_3$)—, and $CH_2$=CH— or CH($CH_3$)=CH— is preferred.

$Z^{22}$ is a carboxy group or a $C_{1-12}$ monovalent saturated hydrocarbon group having a carboxy group, and a carboxy group or a $C_{1-10}$ carboxyalkyl group is preferred.

Specific examples of the monomer C2 may be $CH_2$=CHCOOH, CH($CH_3$)=CHCOOH, $CH_2$=C($CH_3$) COOH, and a compound represented by the formula $CH_2$=CH(CH$_2$)$_{n2}$COOH (where n2 represents an integer of from 1 to 10).

As the monomer C2, two or more types may be used in combination.

As the monomer C, only one of the monomer C1 and the monomer C2 may be used, or both may be used.

The content of units C is, from the viewpoint of the balance between the hardness and the scratch resistance of the second layer, preferably from 1 to 40 mol %, more preferably from 3 to 35 mol %, particularly preferably from 5 to 20 mol %, to all units which the fluorinated polymer $F^0$ contains.

The fluorinated polymer F may contain units other than the above.

The fluorinated polymer $F^0$ preferably contains, from the viewpoint of weatherability and scratch resistance of the present decorative film, units F, units D and units C, in amounts of from 20 to 70 mol %, from 1 to 60 mol % and from 1 to 40 mol %, in this order, to all units which the fluorinated polymer $F^0$ contains.

Tg of the fluorinated polymer F is, from such a viewpoint that the hardness of the present decorative film will be improved, preferably from 10 to 120° C., more preferably from 30 to 100° C., particularly preferably from 40 to 80° C.

Mn of the fluorinated polymer F is, from the viewpoint of scratch resistance of the present decorative film, preferably from 2,000 to 50,000, more preferably from 5,000 to 20,000, particularly preferably from 7,000 to 18,000.

In a case where the fluorinated polymer $F^0$ has a hydroxy group, the hydroxy value of the fluorinated polymer $F^0$ is, from the viewpoint of scratch resistance of the present decorative film and swelling resistance to a plasticizer, preferably from 1 to 150 mgKOH/g, more preferably from 5 to 120 mgKOH/g, particularly preferably from 30 to 100 mgKOH/g.

In a case where the fluorinated polymer $F^0$ has a carboxy group, the acid value of the fluorinated polymer $F^0$ is, from the viewpoint of scratch resistance of the present decorative film and swelling resistance to a plasticizer, preferably from 1 to 150 mgKOH/g, more preferably from 5 to 120 mgKOH/g, particularly preferably from 30 to 100 mgKOH/g.

The fluorinated polymer $F^0$ may have both an acid value and a hydroxy value, and in such a case, the total of the acid value and the hydroxy value is preferably from 1 to 150 mgKOH/g.

Two or more types of the fluorinated polymer $F^0$ may be used from the viewpoint of improving the followability of the second layer to the first layer.

The curing agent has at least two groups capable of reacting with the crosslinkable group in one molecule. The curing agent reacts with the crosslinkable group which the fluorinated polymer $F^0$ contains, whereby the crosslinking proceeds to form the second layer. The curing agent usually has from 2 to 30 groups capable of reacting with the crosslinkable group.

In a case where the fluorinated polymer $F^0$ has a hydroxy group, the curing agent is preferably a curing agent having at least two isocyanate groups or blocked isocyanate groups in one molecule.

In a case where the fluorinated polymer $F^0$ has a carboxy group, the curing agent is preferably a curing agent having at least two epoxy groups, carbodiimide groups, oxazoline groups or β-hydroxyalkylamide groups in one molecule.

As the curing agent having at least two isocyanate groups in one molecule, a polyisocyanate monomer or a polyisocyanate derivative is preferred.

As the polyisocyanate monomer, an alicyclic polyisocyanate, an aliphatic polyisocyanate, or an aromatic polyisocyanate is preferred. As the polyisocyanate derivative, a multimer or a modified form (a biuret form, an isocyanurate form, or an adduct form) of the polyisocyanate monomer is preferred.

Specific examples of the aliphatic polyisocyanate may be aliphatic diisocyanates such as tetramethylene diisocyanate, pentamethylene diisocyanate, hexamethylene diisocyanate, 2,2,4-trimethyl-1,6-diisocyanatohexane and lysine diisocyanate, lysine triisocyanate, 4-isocyanatomethyl-1,8-octamethylene diisocyanate, and bis(2-isocyanatoethyl) 2-isocyanatoglutarate.

Specific examples of the alicyclic polyisocyanate may be alicyclic diisocyanates such as isophorone diisocyanate, 1,3-bis(isocyanatomethyl)-cyclohexane, 4,4'-dicyclohexylmethane diisocyanate, norbornene diisocyanate and hydrogenated xylylene diisocyanate.

Specific examples of the aromatic polyisocyanate may be aromatic diisocyanates such as xylylene diisocyanate, etc.

As the curing agent having at least two blocked isocyanate groups in one molecule, a curing agent in which two or more isocyanate groups contained in the above-mentioned polyisocyanate monomer or polyisocyanate derivative are blocked by a blocking agent is preferred.

The blocking agent is a compound having active hydrogen, and specific examples thereof may be an alcohol, phenol, active methylene, amine, imine, acid amide, lactam, oxime, pyrazole, imidazole, imidazoline, pyrimidine and guanidine.

Specific examples of the curing agent having at least two epoxy groups in one molecule may be bisphenol type epoxy compounds (A type, F type, S type, etc.), diphenyl ether type epoxy compounds, hydroquinone type epoxy compounds, naphthalene type epoxy compounds, biphenyl type epoxy compounds, fluorene type epoxy compounds, hydrogenated bisphenol A type epoxy compounds, bisphenol A-containing nucleated polyol type epoxy compounds, polypropylene glycol type epoxy compounds, glycidyl ester type epoxy compounds, glycidylamine type epoxy compounds, glioxal type epoxy compounds, alicyclic epoxy compounds, alicyclic polyfunctional epoxy compounds, and heterocyclic epoxy compounds (triglycidyl isocyanurate, etc.).

Specific examples of the curing agent having at least two carbodiimide groups in one molecule may be an alicyclic carbodiimide, an aliphatic carbodiimide, an aromatic carbodiimide, and multimers and modified products thereof.

Specific examples of the curing agent having at least two oxazoline groups in one molecule may be an addition-polymerizable oxazoline having a 2-oxazoline group, and a polymer of this addition-polymerizable oxazoline.

Specific examples of the curing agent having at least two 3-hydroxyalkylamide groups in one molecule may be N,N,N',N'-tetrakis-(2-hydroxyethyl)-adipamide (Primid XL-552, trade name of EMS), and N,N,N',N'-tetrakis-(2-hydroxypropyl)-adipamide (Primid QM 1260, manufactured by EMS).

The ratio of the number of moles of the crosslinkable group which the curing agent has to the number of moles of the crosslinkable group which the fluorinated polymer $F^0$ has (the number of moles of the crosslinkable group which the curing agent has/the number of moles of the crosslinkable group which the fluorinated polymer $F^0$ has) is, from the viewpoint of the followability of the second layer to the first layer, preferably from 0.05 to 2.0, more preferably from 0.10 to 1.0, further preferably from 0.15 to 0.50, particularly preferably from 0.20 to 0.40.

Particularly in a case where the above ratio is reduced and Mn of the fluorinated polymer $F^0$ is reduced, the followability of the second layer to the first layer will be more excellent.

The content of the fluorinated polymer F in the second layer is, from the viewpoint of weather resistance of the present decorative film, preferably from 70 to 100 mass %, particularly preferably from 80 to 95 mass %, to the total mass of the second layer.

As the fluorinated polymer F, two or more types may be used in combination.

The second layer preferably contains a surface conditioner. By adjusting the type and content of the surface conditioner contained in the second layer, it is possible to properly adjust the water contact angle of the surface on the first layer side of the second layer.

As the surface conditioner, a silicone-type surface conditioner or a fluorinated surface conditioner is preferred from such a viewpoint that it will be easy to adjust the water contact angle of the surface on the first layer side of the second layer and it will be also excellent in compatibility with the fluorinated polymer F. The silicone-type surface conditioner and the fluorinated surface conditioner may be used in combination, or at least two types of each may be used.

The silicone-type surface conditioner is a compound having an organopolysiloxane skeleton represented by polydimethylsiloxane. As the silicone-type surface conditioner, a compound capable of making the water contact angle of the surface on the first layer side of the second layer higher is preferred.

As a silicone-type surface conditioner (silicone-based leveling agent), an organopolysiloxane such as dimethylpolysiloxane, a modified silicone obtained by modifying an organopolysiloxane, or one wherein part or all of side chains which a polymer such as a (meth)acrylic polymer has, are modified to chains having an organopolysiloxane skeleton, may be mentioned.

As the modified silicone, a compound having a hydrophobic group as an organic functional group in the organopolysiloxane skeleton is preferred. For example, a polyether-modified polydimethylsiloxane, a polyester-modified polydimethylsiloxane, an alkyl-modified polysiloxane, a phenyl-modified polysiloxane, a silicone-modified (meth)acrylic polymer, a block copolymer having a silicone-type segment and a (meth)acrylic-type segment, etc. may be mentioned.

Here, the segment refers to a partial structure, and the same applies hereinafter.

The silicone-type surface conditioner may have a crosslinkable group such as a hydroxy group with a view to improving the compatibility with the fluorinated polymer F and from such a viewpoint that the water contact angle of the surface of the second layer will be maintained by crosslinking with the fluorinated polymer F and the curing agent in the second layer. In such a case, the silicone-type surface conditioner contained in the second layer may be at least partially crosslinked with the fluorinated polymer $F^0$ or the curing agent.

As the silicone-type surface conditioner, from such a viewpoint that the water contact angle of the surface on the first layer side of the second layer can be suitably adjusted, a polyether-modified polydimethylsiloxane, a silicone-modified (meth)acrylic polymer having a hydroxy group, and a block copolymer having a silicone-type segment and a (meth)acrylic-type segment, are preferred, and a silicone-modified (meth)acrylic polymer having a hydroxy group is particularly preferred. The hydroxy value of the silicone-modified (meth)acrylic polymer having a hydroxy group is preferably from 1 to 150 mgKOH/g, more preferably from 10 to 50 mgKOH/g, particularly preferably from 20 to 40 mgKOH/g.

Here, the silicone-type segment is a segment composed of units having an organopolysiloxane skeleton, and the (meth) acrylic-type segment is a segment composed of units based on a (meth)acrylic monomer.

As the silicone-type surface conditioner, the following compounds may be mentioned.

Trade names AC FS 180, AC FS 360, AC S 20, manufactured by Algin Chemie.

Polyether-modified polydimethylsiloxanes manufactured by BYK (trade names: BYK-302, BYK-306, BYK-307, BYK-310, BYK-320, BYK-330, BYK-331, BYK-332, BYK-333, BYK-342, BYK-378, BYK-UV3510, BYK-SILCLEAN3720, BYK-377), polyether-modified polymethylalkylsiloxanes (trade names: BYK-320, BYK-326), polyester-modified polydimethylsiloxanes, manufactured by BYK (trade names: BYK-310, BYK-313, BYK-370), polyester-modified polymethylalkylsiloxanes (trade names: BYK-315N, BYK-325N), aralkyl-modified polymethylalkylsiloxanes (trade names: BYK-322, BYK-323), polyether-modified siloxanes (trade names: BYK-345, BYK-346, BYK-347, BYK-348, BYK-349), a silicone-modified (meth)acrylic polymer (trade name: BYK-SILCLEAN3700), a polyether-polyester-modified dimethylsiloxane (trade name: BYK-375), polyether-modified polydimethylsiloxanes having acrylic functional groups (trade names: BYK-UV3500, BYK-UV3505, BYK-UV3530), a polyester-modified polydimethylsiloxane having acrylic functional groups (trade name: BYK-UV3570), polydimethylsiloxanes having acrylic functional groups (trade names: BYK-UV3575, BYK-UV3576).

Block copolymers having a silicone-type segment and a (meth)acrylic-type segment, manufactured by NOF Corporation (trade names: Modiper FS700, Modiper FS710-1, Modiper FS720, Modiper FS730, Modiper FS770).

A hydroxyalkylpolydimethylsiloxane, manufactured by Evonik Industries (trade name: TEGO PROTECT 5000).

The fluorinated surface conditioner is a compound having a fluorinated alkyl group in which part or all of hydrogen atoms of the alkyl group are substituted by fluorine atoms. The number of carbon atoms contained in the fluorinated alkyl group is preferably from 1 to 20, more preferably from 1 to 10.

As the fluorinated surface conditioner, a perfluoroalkyl sulfonate, a perfluoroalkylethylene oxide adduct, a perfluoroalkyltrimethylammonium salt, a perfluoroalkylaminosulfonate, a perfluoroalkyl group/hydrophilic group-containing oligomer, a perfluoroalkyl group/lipophilic group-containing oligomer, a perfluoroalkyl group/(hydrophilic group and lipophilic group)-containing oligomer, a perfluoroalkyl group/lipophilic group-containing urethane, a perfluoroalkyl phosphoric acid ester, a perfluoroalkyl carboxylate, a perfluoroalkylamine compound, a perfluoroalkyl quaternary ammonium salt, a perfluoroalkylbetaine, a non-dissociable perfluoroalkyl compound, a block copolymer having a fluorinated segment and a (meth)acrylic-type segment, etc., may be mentioned. As the fluorinated surface conditioner, from such a viewpoint that the water contact angle of the surface on the first layer side of the second layer can be suitably adjusted, a block copolymer having a fluorinated segment and a (meth)acrylic-type segment, is preferred.

A fluorinated segment is a segment composed of units based on a monomer having a perfluoroalkyl group or polyfluoroalkyl group, and is preferably a segment composed of units based on a monomer having a $C_{4-8}$ perfluoroalkyl group or polyfluoroalkyl group. The (meth)acrylic-type segment is the same as the segment as described for the silicone-type surface conditioner.

As the fluorinated surface conditioner, NOF Corporation's Modiper F series (F606, F206, F246, F906, F3636, F226, etc.) may be mentioned.

The second layer may optionally contain an acrylic-type surface conditioner having no Si and F atoms, as exemplified by BYK-350, BYK-352, BYK-354, BYK-355, BYK-356, BYK-358N, BYK-359, BYK-360P, BYK-361 N, BYK-364P, BYK-381, BYK-390, BYK-392, BYK-394 (all trade names, manufactured by BYK), other than the silicone-type surface conditioner and the fluorinated surface conditioner.

The content of the surface conditioner in the second layer is, from the viewpoint of weather resistance of the present decorative film, preferably from 0.5 to 30 mass %, particularly preferably from 1 to 20 mass %, to the total mass of the second layer.

The layer thickness of the second layer is, from the viewpoint of moldability of the present decorative film, preferably from 1 to 300 μm, more preferably from 3 to 200 μm, further preferably from 5 to 100 μm, particularly preferably from 10 to 50 μm.

The total light transmittance of the second layer is, from the viewpoint of the design property of the three-dimensional molded product provided with the decorative film of the present invention, preferably at least 70%, more preferably at least 80%, particularly preferably at least 90%.

In the second layer, the water contact angle of the surface on the first layer side is larger than the water contact angle of the surface on the second layer side of the first layer. The water contact angle of the surface on the first layer side of the second layer is, from the viewpoint of adhesion between the first layer and the second layer, preferably from 80 to 130 degrees, more preferably from 90 to 120 degrees, particularly preferably from 100 to 110 degrees.

The above water contact angle is a static contact angle of pure water, and the measuring method is the same as the above-mentioned measuring method for the water contact angle of the surface on the first layer side of the second layer. That is, it is obtainable by peeling the first layer and the second layer at the interface L to expose the surface of the second layer, and measuring the water contact angle at the obtained surface of the second layer.

Here, in the same manner as described above, a plane within 2 μm from the interface L towards the second layer side may be regarded as the surface on the first layer side of the second layer.

Further, in a case where the second layer is a uniform layer, the value obtained by measuring the water contact angle at the air-side surface of the second layer or at a cut surface obtained by cutting the second layer at an arbitrary plane parallel to the interface L, may be regarded as the water contact angle of the surface on the first layer side of the second layer. Here, "the second layer is a uniform layer" means that the difference between the water contact angle of the surface on the first layer side of the second layer and the water contact angle of the surface on the air side of the second layer, is at most 5 degrees (preferably at most 3 degrees).

Further, as a method of adjusting the degree of the water contact angle of the surface on the first layer side of the second layer, a method of using a surface conditioner as described above may be mentioned.

The difference between the water contact angle of the surface on the first layer side of the second layer and the water contact angle of the surface on the second layer side of the first layer (the water contact angle of the surface on the first layer side of the second layer—the water contact angle of the surface on the second layer side of the first layer) is, from the viewpoint of adhesion between the first layer and the second layer, more than 0 degree, preferably at least 5 degrees, particularly preferably at least 10 degrees. Further, the difference between the water contact angle of the surface on the first layer side of the second layer and the water contact angle of the surface on the second layer side of the first layer, is, from the viewpoint of adhesion between the first layer and the second layer, at most 50 degrees, preferably at most 30 degrees, particularly preferably at most 25 degrees. That is, the difference between the water contact angle of the surface on the first layer side of the second layer and the water contact angle of the surface on the second layer side of the first layer, is more than 0 degree and at most 50 degrees, preferably from 5 to 30 degrees, particularly preferably from 10 to 25 degrees.

When the above difference is within the above range, the adhesion between the first layer and the second layer will be excellent.

The second layer is preferably formed by using the above-mentioned composition containing the fluorinated polymer F (hereinafter referred to also as the composition (2)).

The content of the fluorinated polymer F in the composition (2) is, from the viewpoint of weather resistance of the present decorative film, preferably from 5 to 90 mass %, particularly preferably from 10 to 80 mass %, to the total mass of the solid content which the composition (2) contains.

Further, in a case where the composition (2) contains the fluorinated polymer $F^O$, it is preferred that the composition (2) further contains a curing agent.

In a case where the composition (2) contains a curing agent, the content of the curing agent is preferably from 10 to 200 parts by mass, particularly preferably from 50 to 150 parts by mass, to 100 parts by mass of the fluorinated polymer $F^O$ in the composition (2).

The composition (2) preferably contains the above-mentioned surface conditioner.

In a case where the composition (2) contains a surface conditioner, from the viewpoint of adjusting the water contact angle of the surface on the first layer side of the second layer, the content of the surface conditioner is, to the total solid content in the composition (2), preferably from 0.1 to 30 mass %, particularly preferably from 1 to 20 mass %.

In addition to the above-mentioned components, the composition (2) may contain various media (water, an organic solvent, etc.), fillers (inorganic fillers such as silica, organic fillers such as resin beads, etc.), an ultraviolet absorber, a matting agent, a degassing agent, a packing agent, a heat stabilizer, a thickener, a dispersant, an antistatic agent, a rust preventive, a silane coupling agent, an antifouling agent, or a decontamination treatment agent.

The composition (2) preferably contains a solvent. As the solvent, a solvent that is inert to the components contained in the composition (2) is used. For example, in a case where a curing agent having an isocyanate group is contained as the curing agent, a solvent not having a group capable of reacting with an isocyanate group, such as a hydroxy group, is used. As the solvent, an organic solvent such as a ketone, an ester, or a hydrocarbon is preferred.

The surface tension of the composition (2) is preferably from 10 to 40 mN/m from such a viewpoint that it spreads well on the first layer, and the adhesion between the first layer and the second layer will be improved. The surface tension of the composition (2) may be adjusted by the surface conditioner as described above.

A specific example of the method for forming the second layer may be a method in which the composition (2) is applied onto the first layer to form a coating film, and then the obtained coating film is cured.

A specific example of the coating method may be a method using a spray, an applicator, a die coater, a bar coater, a roll coater, a comma coater, a roller brush, a brush, or a spatula.

After applying the composition (2), it is preferred to dry it in order to remove the solvent in the composition (2).

The coating film can be cured by, for example, heat treatment. The heating temperature is preferably from 50 to 250° C., particularly preferably from 60 to 150° C. The heating time is preferably from 1 to 60 minutes.

Further, in a case where the composition (2) is a so-called powder coating material, the second layer may also be formed by electrostatic coating or the like.

From the viewpoint of adhesion to the three-dimensional molded product, the present decorative film preferably has a bonding layer laminated on the base film side. The bonding layer may be laminated so as to be in contact with the base film, or may have another layer between the bonding layer and the base film.

The bonding layer is a layer to bond the present decorative film and the three-dimensional molded product, and preferably contains a bonding resin. Specific examples of the bonding resin may be an adhesive resin, a fusion resin, a tacky resin, etc. The bonding layer may be formed by using, for example, a composition containing a bonding resin or a component that becomes to be a bonding resin by reacting by heat or the like. Hereinafter, a composition containing a component that becomes to be a bonding resin by reacting by heat or the like, will be referred to also as a composition (a).

As the bonding resin, a heat fusible resin and a heat crosslinkable resin are preferred. In the case of a heat fusible resin, the heat-softened resin may be cooled and solidified in a state of being in contact with the surface of the three-dimensional molded product and thus bonded to the surface. In the case of a heat crosslinkable resin, the resin may be heat-crosslinked in a state of being in contact with the surface of the three-dimensional molded product and thus bonded to the surface.

Specific examples of the heat fusible resin may be a partially crosslinked heat fusible resin having a low softening temperature, and a thermoplastic resin. The bonding layer containing the heat fusible resin may be formed by using the heat fusible resin or the composition (a). For example, by using the composition (a) containing a polyol and a polyisocyanate, a bonding layer containing a heat fusible polyurethane resin may be formed.

The softening temperature of the heat fusible resin is preferably from 20 to 100° C., particularly preferably from 25 to 90° C., from the viewpoint of blocking resistance and moldability of the present decorative film.

Mw of the heat fusible resin is preferably from 5,000 to 150,000, particularly preferably from 6,000 to 130,000, from the viewpoint of film formation property and adhesiveness of the bonding layer.

As the heat fusible resin, from such a viewpoint that adhesion to a three-dimensional molded product will be excellent, a urethane resin, a (meth)acrylic resin, an olefin resin, a vinyl chloride-vinyl acetate resin, a butyral resin, etc., are preferred.

The bonding resin may be a heat crosslinkable resin containing a main agent resin and a curing agent. As such a heat crosslikable resin, a heat crosslinkable urethane resin containing a solid polyol or solid hydroxy-terminated polyurethane prepolymer, and a solid polyisocyanate or solid blocked polyisocyanate, or an epoxy resin containing a solid polyepoxide and a solid epoxy resin curing agent, may be mentioned.

The composition (a) may contain the above-mentioned heat crosslinkable resin, or may be one containing a component which becomes to be a heat crosslinkable resin.

The bonding layer may also have a function of a design layer as described later. In such a case, if a colorant or the like is incorporated in the bonding layer, it is possible to obtain a bonding layer having a function as a design layer.

The bonding layer may contain components other than the above. Specific examples of components other than the above may be an ultraviolet absorber, a light stabilizer, a curing catalyst, an antioxidant, a surface conditioner, a sagging inhibitor, a thickener, a defoaming agent and a conductive filler.

The thickness of the bonding layer is, from the viewpoint of film formation property and adhesiveness of the bonding layer, preferably from 1 to 1,000 μm, more preferably from 4 to 80 μm, particularly preferably from 10 to 60 μm.

The components which the composition (a) may contain are the same as the components which the bonding layer may contain. The bonding resin and the components which may be contained in the bonding layer may be dissolved or dispersed in the composition (a) by a solvent such as water or an organic solvent. In a case where the bonding layer forming agent contains a solvent, the solvent will be removed at the time of forming a bonding layer.

In the example in FIG. 1, a case where the decorative film 10 has a bonding layer 12 has been described. However, so long as the decorative film can be attached to the three-dimensional molded product, the present decorative film may not have a bonding layer.

That is, the present decorative film may have at least a base film, a first layer and a second layer.

Although not shown in FIG. 1, the present decorative film may have a design layer in order to improve the design property or the like of the present decorative film. The design layer is a layer to impart a design property to a three-dimensional molded product. The design layer is preferably disposed between the bonding layer and the second layer.

Specifically, in a case where the decorative film 10 in FIG. 1 has a design layer, there may be, for example, an embodiment in which the bonding layer 12, the design layer, the base film 14, the first layer 16 and the second layer 18 are disposed in this order, or an embodiment in which the bonding layer 12, the base film 14, the design layer, the first layer 16 and the second layer 18 are disposed in this order.

Further, the bonding layer, the base film, the first layer or the second layer may also serve as the design layer, and in such a case, the design layer may not be provided.

Specific examples of the design layer may be a layer formed by using a composition for forming a design layer, a layer formed by a printing method, and a layer formed by a metal vapor deposition method.

Specific examples of the components contained in the above composition may be a binder resin (a urethane resin, a (meth)acrylic resin, etc.), a colorant (a dye, an organic pigment, an inorganic pigment, a bright pigment using metal, mica, etc.), and a solvent (water, an organic solvent, etc.).

The layer formed by a printing method is formed by using an ink (containing, for example, a binder resin, a colorant and a solvent) suitable for each printing method such as inkjet printing, screen printing, offset printing and flexographic printing.

The layer formed by the metal vapor deposition method is formed by using a metal such as aluminum, indium, or tin.

The design layer may contain components other than the above, as the case requires, and specifically the components listed in the composition (a) and the components listed in the composition (2) as described above, may be mentioned.

The thickness of the design layer may be suitably set depending on the intended application.

The present decorative film is obtainable, for example, by the following methods. In the following methods, the laminating method is not particularly limited.

A method for obtaining the present decorative film, in which the composition (2) is applied onto the surface of the first layer of a film having a base film and the first layer so that the first layer is disposed at the outermost surface, to form a second layer.

A method for obtaining the present decorative film, in which the composition (2) is applied onto the surface of the first layer of a film having no base film and having the first layer at the outermost surface, to form the second layer, and then a base film is laminated on the surface opposite to the second layer of the first layer.

A method for obtaining the present decorative film by laminating the surface of the first layer of a film having a base film and the first layer so that the first layer is disposed at the outermost surface, and the second layer.

A method for obtaining the present decorative film by laminating a base film, a film in which the first layer is disposed at the outermost surface, and a second layer in this order so that the first layer and the second layer are in contact with each other.

Among the above methods, from such a viewpoint that adhesion between the first layer and the second layer will be excellent, it is preferred to obtain the present decorative film, by forming a second layer by applying the composition (2) having a surface tension of from 10 to 40 mN/m on the surface of the first layer having a water contact angle of from 60 to 100 degrees, which is laminated on a base film.

The present decorative film is preferably used by being stretched and particularly preferably used by being stretched at least 1.2 times, in order to impart a design property to the object to be decorated (for example, a three-dimensional molded product as described later) or to protect the surface of the object to be decorated. The stretching direction and stretching method may be suitably selected depending on the shape of the three-dimensional molded product, the manufacturing conditions at the time of molding, etc. The stretching direction may be any direction, and the stretching method may be any method. That is, the stretching of the present decorative film may be carried out by pulling the present decorative film in a predetermined direction or in all directions, and may be carried out by suitably heating and expanding the present decorative film.

The three-dimensional molded product provided with a decorative film of the present invention (hereinafter referred to also as the present molded product) is preferably obtained by press-bonding the present decorative film and the surface to be decorated of the three-dimensional molded product under reduced pressure.

The press-bonding method under reduced pressure in the method for producing the present molded product is also called a vacuum forming method (overlay molding method), and may be carried out by using, for example, a double-sided vacuum forming apparatus.

Under reduced pressure means a state in which the pressure is lower than the standard atmospheric pressure. The pressure under reduced pressure is preferably at most 70 kPa.

Further, the present molded product may be obtained by a molding method other than the vacuum forming method. Specific examples of such a molding method may be in-mold molding, in-mold transfer molding, in-mold pasting molding, overlay transfer molding, overlay pasting molding and hydraulic transfer. Further, the present decorative film may be press-bonded to a three-dimensional molded product before molding, followed by processing to obtain a three-dimensional molded product provided with the decorative film.

Specific examples of the materials constituting the three-dimensional molded product may be a polypropylene, an ABS resin, an AAS resin, an AES resin and a polycarbonate.

Specific examples of the three-dimensional molded product may be automobile exterior parts such as door mirrors, front under spoilers, rear under spoilers, side underskirts, bumpers and side garnishes, and automobile interior parts such as center consoles, instrument panels and door switch panels. In addition to the above, the present decorative film may be suitably used for a liquid crystal surface of a display, a wall material, a signboard, etc.

The present decorative film is suitably used for decorating a three-dimensional molded product used for an automobile exterior part or an automobile interior part. Here, in this specification, decoration means imparting a design property to the surface of an article, protecting the surface, etc.

Since the composition (2) in the present invention can form a coating film having excellent adhesion, it is possible that the composition (2) is coated on a plate-shaped base material and cured to obtain a base material provided with a coating film, and then, the base material provided with a coating film is subjected to vacuum forming to obtain a three-dimensional molded product. Such a method for producing a three-dimensional molded product is suitable in the case of producing an automobile exterior part, particularly a large-area part such as a bonnet or a roof.

EXAMPLES

In the following, the present invention will be described in detail with reference to Examples. However, the present invention is not limited to these Examples. The blending amount of each component in Table 1 given later indicates a mass standard. Further, Ex. 1 to 7 are Examples of the present invention, and Ex. 8 is a Comparative Example.
<Abbreviations and Details of Components Used>

Polymer F1: A polymer containing units based on CTFE (chlorotrifluoroethylene), units based on EVE (ethyl vinyl ether), units based on CHVE (cyclohexyl vinyl ether) and units based on HBVE (4-hydroxybutyl vinyl ether) in amounts of 50 mol %, 25 mol %, 15 mol %, 10 mol % in this order, to all units contained in the fluorinated polymer (hydroxy value: 52 mgKOH/g, Tg: 40° C., Mn: 20,000)

Polymer F2: A polymer containing units based on CTFE, units based on CHVE and units based on HBVE in amounts of 50 mol %, 39 mol % and 11 mol % in this order, to all units contained in the fluorinated polymer (hydroxy value: 50 mgKOH/g, Tg: 52° C., Mn: 10,000)

Polymer F3: A polymer containing units based on CTFE, units based on EVE and units based on HBVE in amounts of 50 mol %, 40 mol % and 10 mol % in this order, to all units contained in the fluorinated polymer (hydroxy value: 57 mgKOH/g, Tg: 25° C., Mn: 20,000)

Solvent 1: Butyl acetate

Solvent 2: Xylene

Solvent 3: Methyl ethyl ketone

Curing agent 1: E405-70B (Adduct body of hexamethylene diisocyanate, manufactured by Asahi Kasei Corporation)

Curing agent 2: A mixture of a nurate body and biuret body of polyisocyanate

Curing catalyst 1: Dibutyltin dilaurate (undiluted product)

Curing catalyst 2: Dibutyltin dilaurate (1,000-fold diluted product)

Curing catalyst 3: U-CAT (10-fold diluted product, trade name of San-Apro Ltd.)

Surface conditioner 1: BYK-Silclean 3700 (manufactured by BYK, 25 mass % solution, silicone-type surface conditioner, hydroxy group-containing silicone-modified (meth) acrylic polymer)

Surface conditioner 2: Modiper F606 (manufactured by NOF Corporation, fluorinated surface conditioner, block copolymer having a fluorinated segment and a (meth) acrylic-type segment)

Surface conditioner 3: tego protect 5000N (manufactured by EVONIK, silicone-type surface conditioner, hydroxyalkyl polydimethylsiloxane)

PVDF: polyvinylidene fluoride (manufactured by ARKEMA)

PMMA: polymethyl methacrylate (manufactured by ARKEMA)

PU: polyurethane (manufactured by BASF, ET-385 (trade name))

PET: Indium-vapor deposited polyethylene terephthalate

Ex. 1 to 8

By mixing the respective components as described in the column for components in the second layer in Table 1, compositions (2-1) to (2-8) were obtained.

A first layer made of polyvinylidene fluoride was laminated on one surface of a base film (material: vinyl chloride resin, plasticizer: di-2-ethylhexyl phthalate, plasticizer content: 20 mass % to the total mass of the base film).

Next, the composition (2-1) was applied onto the first layer by using an applicator, dried at 25° C., then cured by heating at 80° C. for 5 minutes, to form a second layer having a film thickness of 20 μm.

By the above method, a decorative film 1 in which the base film, the first layer and the second layer were laminated in this order, was obtained.

Decorative films 2 to 8 were obtained in the same manner as above, except that the composition (2-1) was changed to the compositions (2-2) to (2-8), and the types of material of the first layer were changed as shown in Table 1.

<Production of Molded Products>

Using a double-sided vacuum forming device, the decorative film 1 and the three-dimensional molded product (ABS panel) were heated at 140° C. for 1 minute while being press-bonded under reduced pressure by a vacuum forming method to obtain a molded product 1 being a three-dimensional molded product provided with a decorative film. The molded product 1 had the second layer of the decorative film at the outermost surface.

Molded products 2 to 8 were obtained in the same manner as described above except that the decorative film 1 was changed to the decorative films 2 to 8.

<Evaluations>

The obtained decorative films 1 to 8 and molded products 1 to 8 were subjected to the evaluations as described later. The obtained results are shown in Table 1. In Table 1, the "difference in water contact angle" is a value obtained by subtracting the water contact angle of the surface on the second layer side of the first layer from the water contact angle of the surface on the first layer side of the second layer. Further, "INDEX" is the ratio of the number of moles of the crosslinkable group which the curing agent has to the number of moles of the crosslinkable group which the polymer F1 to F3 has (the number of moles of the crosslinkable group which the curing agent has)/the number of moles of the crosslinkable group which the polymer F1 to F3 has) in each Ex.

<Water Contact Angle>

The first layer and the second layer in the decorative film were cross-sectionally observed by a scanning electron microscope equipped with an energy dispersive X-ray analyzer, whereby the depth of each layer was estimated, and then, by using a peel strength test machine (SAICAS EN.NN, manufactured by DAIPLA WINTES CO., LTD.), the first layer and the second layer were peeled off at the interface L between them. Pure water having a diameter of from 1 to 2 mm was dropped on the surface of each of the obtained layers (first layer or second layer), and the droplets after 30 seconds from the dropping were photographed by a video camera and image-analyzed. Twice the angle of the straight line connecting an end point and a vertex of a water droplet to the surface of the layer was taken as the value of the static contact angle. Here, the measurement was carried out 5 times, and the average value of the measured values for the 5 times is shown in Table 1.

<Interlayer Adhesion>

The interlayer adhesion of the decorative film was evaluated as follows in accordance with JIS6854-1: 1999.

The decorative film was cut into a size of 150 mm in length and 10 mm in width to obtain a test film. The second layer was peeled from the first layer using a utility knife to a position of 50 mm from one end in the length direction of the test film, and then using a tensile tester, the maximum load (N/10 cm) when peeled at a tensile speed of 50 mm/min. so that the first layer and the second layer became to be 90 degrees, was measured. The larger the value of the maximum load, the better the interlayer adhesion between the first layer and the second layer in the decorative film.

A: The maximum load is at least 10 N/cm.
B: The maximum load is less than 10 N/cm.

<Swelling Resistance>

A gauze (50 mm×50 mm) was placed on the surface (on the second layer) of the decorative film in the molded product, and a load of 1.0 kg was applied from above the gauze, and left to stand still for one week in a high temperature high humidity tank at a temperature of 40° C. and a humidity of 70%. After that, the gauze placed on the decorative film was peeled off, and the ratio of the area of the gauze remaining on the decorative film to the total area of the gauze before the evaluation was visually observed, and the swelling resistance of the decorative film was evaluated as follows.

A: The area of gauze remaining on the decorative film is less than 10%.
B: The area of gauze remaining on the decorative film is at least 10%.

<Scratch Resistance>

After rubbing the surface on the decorative film side of the molded product in a predetermined number of reciprocating times by using steel wool (#0000), the surface was visually observed, whereby the scratch resistance of the decorative film in the molded product was evaluated in accordance with the following standards. The number of reciprocating times in the following standards is the number of times at the time when scratches are first observed on the surface of the second layer. Further, the load on the steel wool at the time of rubbing the surface of the molded product was 200 g.

S: At least 15 reciprocating times
A: At least 10 reciprocating times and less than 15 reciprocating times
B: Less than 10 reciprocating times <Followability>

The followability of the second layer to the first layer in the decorative film was evaluated as follows. The larger the elongation rate at the time when peeling of the first layer and the second layer occurred for the first time, the better the followability and the better the interlayer adhesion between the first layer and the second layer.

Using Autograph AGS10KNG manufactured by SHIMADZU Corporation and TERMOSTATIC CHAMBER Model: TCRI-200SP, manufactured by SHIMADZU Corporation, a tensile test was conducted in the long side direction under conditions of a decorative film size being short side 10 mm×long side 100 mm, a chuck distance of 50 mm, a tensile speed of 50 mm/min and a tensile constant temperature tank temperature of 23° C., whereby judgement was made by the elongation rate of the decorative film at the time when peeling of the first layer and the second layer occurred for the first time (the chuck-to-chuck length of the decorative film at the time when the peeling of the first layer and the second layer occurred for the first time by the tensile test/the chuck-to-chuck length before the tensile test×100). The followability test was conducted only in Ex. 7 and 8.

S: At least 200%
A: At least 160% and less than 200%
B: Less than 160%

TABLE 1

| | Ex. | | 1 | 2 | 3 | 4 | 5 | 6 | 7 | 8 |
|---|---|---|---|---|---|---|---|---|---|---|
| | Decorative film or molded product | | 1 | 2 | 3 | 4 | 5 | 6 | 7 | 8 |
| Second | Components | Polymer F1 | 5 | 5 | 5 | 5 | 5 | 5 | | |
| layer | (g) | Polymer F2 | | | | | | | 5 | |
| | | Polymer F3 | | | | | | | | 5 |

TABLE 1-continued

| Ex. | | | 1 | 2 | 3 | 4 | 5 | 6 | 7 | 8 |
|---|---|---|---|---|---|---|---|---|---|---|
| | | Solvent 1 | 5 | 5 | 5 | 5 | 5 | 5 | | |
| | | Solvent 2 | | | | | | | 7.5 | |
| | | Solvent 3 | | | | | | | | 8.3 |
| | | Curing agent 1 | 3.0 | 3.0 | 3.0 | 3.0 | 3.0 | 3.0 | 1.0 | 1.7 |
| | | Curing agent 2 | | | | | | | | |
| | | Curing catalyst 1 | 0.01 | 0.01 | 0.01 | 0.01 | 0.01 | 0.01 | | |
| | | Curing catalyst 2 | | | | | | | 0.12 | 0.12 |
| | | Curing catalyst 3 | | | | | | | 0.07 | 0.07 |
| | | Surface conditioner 1 | 1 | | | 1 | 1 | | 0.73 | 0.73 |
| | | Surface conditioner 2 | | 1 | | | | | | |
| | | Surface conditioner 3 | | | 1 | | | | | |
| | | Additive | | | | | | | 1.2 | 1.2 |
| | | Water contact angle (degrees) | 105 | 107 | 95 | 105 | 105 | 78 | 78 | 107 |
| | | INDEX | 1.00 | 1.00 | 1.00 | 1.00 | 1.00 | 1.00 | 0.25 | 0.25 |
| First layer | Component | Specific polymer | PVDF | PVDF | PVDF | PMMA | PU | PVDF | PET | PET |
| | | Water contact angle (degrees) | 81 | 81 | 81 | 74 | 73 | 81 | 68 | 68 |
| Evaluation results | Difference in water contact angle (degrees) | | 24 | 26 | 14 | 31 | 32 | −3 | 10 | 39 |
| | Interlayer adhesion | | A | A | A | A | A | B | A | A |
| | Swelling resistance | | A | A | A | A | A | B | A | A |
| | Scratch resistance | | S | S | S | S | S | B | A | S |
| | Followability | | — | — | — | — | — | — | S | A |

As shown in Table 1, the desired effects were obtained by using a decorative film having a predetermined composition.

This application is a continuation of PCT Application No. PCT/JP2019/023339, filed on Jun. 12, 2019, which is based upon and claims the benefit of priority from Japanese Patent Application No. 2018-113189 filed on Jun. 13, 2018. The contents of those applications are incorporated herein by reference in their entireties.

REFERENCE SYMBOLS

10: Decorative film
12: Bonding layer
14: Base film
16: First layer
18: Second layer

What is claimed is:

1. A decorative film characterized by comprising
a base film containing a plasticizer,
a first layer containing at least one selected from the group consisting of a polyvinylidene fluoride, a polymethylmethacrylate, a polyurethane and a polyester, and
a second layer containing a surface conditioner and a fluorinated polymer containing units based on a fluoroolefin, and units based on at least one non-fluorinated monomer selected from the group consisting of a vinyl ether, a vinyl ester, an allyl ether and an allyl ester, in this order, wherein
the water contact angle of the surface on the first layer side of the second layer is larger than the water contact angle of the surface on the second layer side of the first layer, and the difference between the water contact angle of the surface on the first layer side of the second layer and the water contact angle of the surface on the second layer side of the first layer is more than 0 degree and at most 50 degrees.

2. The decorative film according to claim 1, wherein the surface conditioner of the second layer is a silicone-type surface conditioner or a fluorinated surface conditioner.

3. The decorative film according to claim 1, wherein the difference between the water contact angle of the surface on the first layer side of the second layer and the water contact angle of the surface on the second layer side of the first layer is at least 10 degrees.

4. The decorative film according to claim 1, wherein the difference between the water contact angle of the surface on the first layer side of the second layer and the water contact angle of the surface on the second layer side of the first layer is at most 30 degrees.

5. The decorative film according to claim 1, wherein the fluorinated polymer has a crosslinked structure.

6. The decorative film according to claim 1, wherein the base film contains at least one selected from the group consisting of a vinyl chloride resin, a polyester resin, an ABS resin and a (meth)acrylic resin.

7. The decorative film according to claim 1, wherein the content of the plasticizer is from 0.5 to 30 mass % to the total mass of the base film.

8. The decorative film according to claim 1, wherein the plasticizer is a plasticizer containing at least one selected from the group consisting of a phthalic acid ester, an adipic acid ester, a phosphoric acid ester and a trimellitic acid ester.

9. The decorative film according to claim 1, which is suitable for decorating a three-dimensional molded product suitable for an automobile exterior part or an automobile interior part.

10. A method for producing a decorative film, which comprises applying a composition having a surface tension of from 10 to 40 mN/m onto the surface of a first layer laminated on a base film and having a water contact angle of from 60 to 100 degrees, to form a second layer, thereby to obtain the decorative film as defined in claim 1.

11. The method for producing a decorative film according to claim 10, wherein the composition comprises a fluorinated polymer having a crosslinkable group and a curing agent, and
the ratio of the number of moles of the crosslinkable group which the curing agent has to the number of moles of the crosslinkable group which the fluorinated polymer has, is from 0.05 to 2.0.

12. The method for producing a decorative film according to claim 11, wherein the number average molecular weight of the fluorinated polymer is from 2,000 to 50,000.

13. A method for producing a three-dimensional molded product provided with a decorative film, which comprises press-bonding the decorative film as defined in claim 1 and the surface to be decorated of a three-dimensional molded product, under reduced pressure, to obtain the three-dimensional molded product provided with the decorative film, having the second layer at the outermost surface.

* * * * *